United States Patent [19]

Goldberg

[11] Patent Number: 4,938,079
[45] Date of Patent: Jul. 3, 1990

[54] THERMAL TRANSIT TIME FLOW MEASUREMENT SYSTEM

[75] Inventor: Jack Goldberg, San Diego, Calif.
[73] Assignee: Ivac Corporation, San Diego, Calif.
[21] Appl. No.: 319,353
[22] Filed: Mar. 6, 1989
[51] Int. Cl.⁵ ............................................... G01F 1/68
[52] U.S. Cl. ................................ 73/861.95; 73/204.23; 604/65
[58] Field of Search ............ 73/861.95, 861.05, 861.06, 73/861.07, 204.23; 324/58.5 A, 58.5 C; 374/122; 604/65, 67

[56] References Cited

U.S. PATENT DOCUMENTS

| | | | |
|---|---|---|---|
| 2,792,548 | 5/1957 | Hershberger | 324/58.5 C |
| 3,019,647 | 2/1962 | Beard et al. | 73/861.95 |
| 3,807,228 | 4/1974 | Matzuk | 73/861.95 |
| 4,014,206 | 3/1977 | Taylor | |
| 4,043,195 | 8/1977 | Hunting | |
| 4,228,683 | 10/1980 | Juffa et al. | |
| 4,234,844 | 11/1980 | Yukl | |
| 4,237,730 | 12/1980 | Feng | |
| 4,255,968 | 3/1981 | Harpster | |
| 4,384,578 | 5/1983 | Winkler | |
| 4,458,709 | 7/1984 | Springer | |
| 4,480,483 | 11/1984 | McShane | 73/861.95 |
| 4,483,200 | 11/1984 | Togawa et al. | |
| 4,491,024 | 1/1985 | Miller, Jr. | |
| 4,509,974 | 4/1985 | Gray et al. | |
| 4,532,811 | 8/1985 | Miller, Jr. et al. | |
| 4,576,182 | 3/1986 | Normann | |
| 4,628,743 | 12/1986 | Miller, Jr. et al. | |
| 4,684,367 | 8/1987 | Schaffer et al. | |
| 4,715,727 | 12/1987 | Carr | 374/122 |

FOREIGN PATENT DOCUMENTS 533826 10/1976 U.S.S.R. ............................ 73/861.95

OTHER PUBLICATIONS

Miller and Small, "Thermal Pulse Time-Of-Flight Liquid Flow Meter", Analytical Chemistry, vol. 54, No. 6, pp. 907–910, 1982.
Hoffman and Miller, "Effect of Non-Newtonian Solutions on the Behavior of the Thermal Pulse Time-Of-Flight Flowmeter", Analytical Chemistry, vol. 56, No. 9, pp. 1682–1685, 1984.

Primary Examiner—Charles A. Ruehl
Attorney, Agent, or Firm—Fulwider, Patton, Lee & Utecht

[57] ABSTRACT

The apparatus accurately measures flow rate of fluid within a conduit without direct fluid contact, based on the introduction of a thermal marker into the fluid stream by means of at least one externally mounted heater, and detection of the thermal marker by means of at least one externally mounted sensor. The transit time of the thermal marker can be ascertained for transit of the thermal marker from a heater to a sensor, or from one sensor to another sensor. A preferred embodiment of the heater comprises a resonant microwave cavity which heats the fluid radiatively, and a preferred embodiment of the sensor comprises a resonant microwave cavity through which a portion of the fluid conduit passes, the resonant characteristics of said microwave sensor being perturbed by the passage of the thermal marker.

29 Claims, 6 Drawing Sheets

THERMAL TRANSIT TIME FLOW MEASUREMENT SYSTEM

BACKGROUND OF THE INVENTION

1. Field of the Invention

This invention relates generally to devices for measuring fluid flow rate within a conduit and without direct fluid contact, and more particularly relates to devices for nonintrusively measuring the rate of flow of intravenous fluid or infusate being dispensed by an infusion pump or controller system, as well as the rate of fluid flow in a variety of medical and industrial applications.

2. Description of Related Art

In many applications, the metering of the rate of fluid flow through a conduit is essential, and thus numerous mechanical and electrical means of such flow rate measurement have been developed. Accurate and inexpensive fluid flow measurement without direct fluid contact is especially important in the medical area, where sterilization, safety, disposability of the fluid path, and cost are of great concern. There are other non-medical applications, for example in the chemical process industry, where inexpensive and/or disposable fluid conduits may be required, or where fluids may be present at high temperature or high pressure, or where fluids which are highly caustic or highly toxic may be involved. Many existing types of systems for fluid flow measurement, such as turbine, target, positive displacement, differential pressure, hot-wire anemometers, rotameters, and others, generally incorporate components which must be in direct contact with the flowing fluid. Electromagnetic flow meters based on the Faraday principle require a pair of electrodes in direct contact with an electrically conductive fluid and exhibit poor accuracy below about 100 cc/hr. Other flow rate measurement systems, such as laser Doppler velocimeters and coriolis flow meters, are prohibitively expensive, and still other systems cannot operate over the wide range of rates and fluid types required in many applications. In situations where the fluid's viscosity is unknown, differential pressure types can be inaccurate, and in situations where the fluid's specific heat is unknown, systems which involve the continuous addition of heat can be inaccurate. Low flow rates are very important in numerous industrial and medical applications and are especially challenging for all of the above-mentioned flow measurement techniques.

In the context of administration of fluid infusate in a hospital setting, it is important that the fluid path be disposable and inexpensive and that many different types of fluids be delivered at an accurate flow rate under a variety of conditions. Many medical fluid delivery systems incorporate no specific means of measuring fluid flow rate, relying on the accuracy of a pumping mechanism, and many incorporate a means to measure flow which is highly inaccurate and used only to detect instrument malfunctions. A large number of medical infusion systems measure the rate of flow by counting drops of fluid as they pass through a drip chamber, and others measure flow rate by positive displacement, repeatedly filling a chamber of known volume and dumping its contents by means of an arrangement of valves.

The common method of measuring the rate of flow of administration of an infusate to a patient by counting drops is inaccurate for many reasons. Among these reasons are variation in drop size due to temperature and fluid type changes, surface tension variations, and vibrations. Systems which measure fluid flow by positive displacement require comparatively costly disposable sets due to the close dimensional tolerances necessary in the manufacture of the chamber and associated valves. Furthermore, high viscosity fluids, variations in head height, and in-line filters can all reduce the accuracy of conventional methods of measuring flow rate through a fluid infusion set. In the context of administration of fluid infusate in a hospital setting, it is important that the fluid infusion sets be disposable, and that the infusate administration system should be simple and inexpensive, and accurate with a variety of fluid types over the full range of environmental conditions.

In connection with infusion pumps, drop sensor monitoring generally is used to detect gross errors in flow rate, and is not used to directly control a pumping mechanism. At any given desired flow rate, the pumping mechanism operates in an unchanging manner, independent of head height, fluid viscosity, or pressure, provided that an alarm condition is not triggered in some way.

U.S. Pat. No. 4,491,024 (Miller, Jr.) relates to a method and apparatus for metering fluid flow at rates below 10 cc per minute. A heat pulse is introduced through a calibrated cell and the pulse is detected downstream. The detection of the pulse is used to trigger a subsequent heat pulse, and the time intervals between successive pulses is measured to determine the rate of travel. U.S. Pat. No. 4,532,811 (Miller, Jr., et al) describes a similar apparatus, in which a resistance heating element and a heat sensing thermistor are used with a flow cell for determining rate of flow. U.S. Pat. No. 4,628,743 (Miller, Jr., et al) describes another similar method, in which the time derivative of the heat detector's signal is used to trigger the heat pulses.

U.S. Pat. No. 4,458,709 (Springer) relates to measurement and control of fluid flow rates, and also generation and detection of heat pulses in a liquid flow. A thermal pulse is delivered into the fluid flow, the time of flight of the leading edge of the pulse is detected to determine flow rate, and the lagging edge of the heat pulse is detected, triggering the generation of a subsequent thermal pulse. A thermocouple type sensor is described.

U.S. Pat. No. 4,384,578 (Winkler) describes a thermal fluid flow rate measurement system utilizing continuous external heating and temperature sensing. In that system, the heat required to maintain a temperature differential between a heated area of tubing and an unheated area of tubing is measured as a function of fluid flow in the line. Contact shells are provided around the tube for providing heat to the fluid in the line and for sensing heat. U.S. Pat. No. 4,255,968 (Harpster), describes a flow rate measurement system involving continuous heating and two downstream sensors. A first sensor is placed near the heater within the thermal influence of the heater, and a second sensor is thermally isolated from the heater. The heating element is a resistance heater, mounted with one of the sensors on a thermally conductive conduit forming a portion of the line in which fluid flow is measured. Measurement of fluid flow involves comparing the signals from the first and second sensors to derive the rate of flow.

Another type of externallized sensor is described in U.S. Pat. No. 4,014,206 (Taylor), in which an apparatus and method for monitoring air emboli in tubing carrying blood or other fluid, such as during kidney dialysis, involves the measurement of the complex dielectric constant of the fluid, without direct fluid contact, to monitor changes in the fluid which may be caused by passage of air in the tubing. U.S. Pat. No. 4,234,844 (Yukl) also describes a method and apparatus for following changes in the complex dielectric constant of fluid within a region of interest, such as within the heart wall in a person's body, without directly contacting the fluid being monitored.

It would be desirable to provide a flow measurement means allowing for the design of fluid delivery systems which are "closed loop", in which information from the flow measurement means is used to control the pump mechanism. In this way, the system can dynamically correct for any condition which would alter the flow rate, such as head height or pressure; and accuracy constraints on the pumping mechanism itself are significantly reduced. It would be desirable to provide an accurate means of fluid flow measurement which does not involve direct fluid contact in medical applications where toxicity or potential for infection is significant, such as in the metering of urine output or blood. Additionally, it would be beneficial in many medical and industrial applications to provide a flow rate measurement system which can function accurately without direct fluid contact over a wide range of flow rates, fluid types and environmental conditions. When applied to flow measurement systems which are based on the generation and detection of heat pulses, resistance heaters and thermistor or thermocouple sensors generally must be in contact with the fluid and also involve time lags due to heat convection, which affect the precision of measurement. It would also be desirable to provide a mode of heating and sensing which did not involve convection time lag.

It would further be desirable to provide a disposable, inexpensive, accurate system of measuring flow of fluid, utilizing precise and rapid generation and sensing of heat pulses, neither requiring contact with the fluid, nor individual calibration of each set, and which can work accurately with a variety of fluids regardless of specific heat or viscosity. The present invention meets these needs.

SUMMARY OF THE INVENTION

The present invention provides for an apparatus for measuring the mean velocity or volumetric rate of fluid flow in a conduit without direct fluid contact. The apparatus includes at least one externally mounted heater for generating heat pulses in the fluid flow, and an externally located sensor for detecting the travel of the heat pulse in the tube. Each heat pulse is generated by radiative energy preferably provided by a microwave heating device. The travel of the heat pulse in the conduit is detected by one or more sensors located at or downstream from the area of heat pulse generation, which preferably detect a perturbation in the resonant frequency of a microwave cavity encompassing the fluid, without directly contacting the fluid in the conduit. An alternative means of introducing a thermal marker is through the use of focused infrared energy produced by a laser or other source. Another possible means of sensing the passage of the heat pulse is through the use of one or more external infrared temperature sensors or microwave radiometers.

Briefly and in general terms, the apparatus for measuring the rate of flow of fluid through a conduit without direct fluid contact comprises at least one heater means for generating thermal markers in the fluid flow, the heater means being disposed external to the conduit; at least one sensor means disposed external to the conduit for detecting the travel of the thermal markers in the conduit, the sensor means being operative to generate a signal responsive to detection of the travel of the thermal marker in proximity to the sensor means, and means for determining a parameter of fluid flow rate within the conduit responsive to the signal from the sensor means.

Other aspects and advantages of the invention will become apparent from the following detailed description, and the accompanying drawings, illustrating by way of example the features of the invention.

DETAILED DESCRIPTION OF THE INVENTION

As is shown in the drawings for purposes of illustration, the invention is embodied in an apparatus for measuring the rate of flow of a fluid through a conduit without direct contact with the fluid, comprising at least one heater means for generating a heat pulse in the fluid flow, and at least one sensor means for detecting the heat pulse in the conduit. Means are also provided for analyzing the output signals of the sensor means for determining the mean velocity or the volumetric rate of flow. The heater means and the sensor means are placed externally in close proximity to, or adjacent to the fluid conduit. In a preferred embodiment, a microwave heater is provided for rapid generation of heat pulses in the fluid, and the sensor means includes a microwave cavity. The sensor means is responsive to perturbation of the resonant characteristics of the microwave cavity caused by temperature changes of fluid in the conduit, for a rapid and precise determination of travel of the heat pulse in the conduit. In a further preferred embodiment, a series of heat sensor elements are placed in an array downstream of the heater means to provide flow rate data at a wide range of flow rates. In an alternative embodiment the heat pulse sensor means may comprise externally placed infrared sensors, or externally placed microwave radiometers which are also responsive to temperature changes of the fluid.

The technique of the present invention provides a system of fluid flow measurement which is highly independent of fluid temperature and pressure, ambient temperature and pressure, fluid composition, fluid viscosity, and fluid specific heat, provided that the flow is substantially laminar and Newtonian.

In accordance with the invention, an apparatus is provided for measuring the rate of flow of a fluid through a conduit, comprising at least one heater means for generating radiative heat energy in the fluid flow sufficient to produce a thermal marker in the fluid flow, the heater means being disposed external to the conduit; at least one sensor means for detecting the thermal marker in the fluid disposed external to the conduit, and adapted to generate an electrical signal responsive to the proximity of the thermal marker to the sensor means; and signal processing means operatively connected to the heater means and the sensor means for determining a parameter of the rate of fluid flow within the conduit responsive to the signal from the sensor means.

As is shown in the drawings, the invention is a thermal transit time flow measurement system and apparatus, which is described by way of example as being operable in conjunction with a system for infusing intravenous fluid through a tube to a patient. However, it should be readily apparent that the invention is also useful for measuring fluid flow through conduits generally, such as for urine flow or blood flow, in industrial drug manufacturing processes, or in other similar medical, scientific and industrial applications. A disposable IV set is shown as having a tube 10, with an exterior surface 11, and contains a fluid infusate. The basic measurement procedure involves heating of a specific region of fluid within the infusate stream and timing its movement downstream. In a currently preferred embodiment, radiative heating provided by a single microwave heater 12 generates the heat pulse or thermal marker 16, and one or more microwave sensing elements 14a, b, c are positioned outside the fluid conduit, such that the fluid conduit passes through or adjacent to them downstream from the microwave heater, with the heating and sensing being provided without direct fluid contact. Heating is preferably accomplished by exposing the infusate to microwave radiation for a period of from 0.1 to 20 seconds. The temperature rise in the vicinity of the thermal marker depends upon heater power, flow rate, heat pulse duration, heater efficiency, fluid specific heat, and other factors, but generally a typical temperature rise of an intravenous fluid infusate will be on the order of a few degrees centigrade in the warmed zone. Flow rate is related to the time interval during which the warmed zone moves from the heater to a sensor, or from one sensor to another sensor as the fluid moves downstream.

In order to accommodate the wide flow rate range required of some instruments, either two or more sensor elements or two or more heater elements are preferably used, although it is only necessary to provide one such heater and one such sensor. In a system with multiple sensors, for example, at high flow rates, sensor elements further from the heater will provide the primary flow rate data, whereas at lower flow rates, those elements nearer the heater will provide the primary data. This is due to the fact that at low flow rates heat energy in the warmed zone will dissipate before the heated region approaches the far sensor array elements, while at high flow rates, the near elements will detect the heated zone too soon after the beginning of the onset of the heater pulse to provide accurate information. An alternative to a plurality of sensors downstream would be a plurality of heaters upstream, with selection of a particular heater being determined as approriate to an estimated rate of flow. Although described as being used with an infusion pump, the flow measurement system of the invention can function equally well within an infusion controller device which relies on the force of gravity to move fluid and does not involve a pumping mechanism. Because the flow measurement system provides feedback to control the infusion instrument, the pump or controller mechanism used in such a system need not be as accurate as that required in a conventional open loop design.

Figure 1:
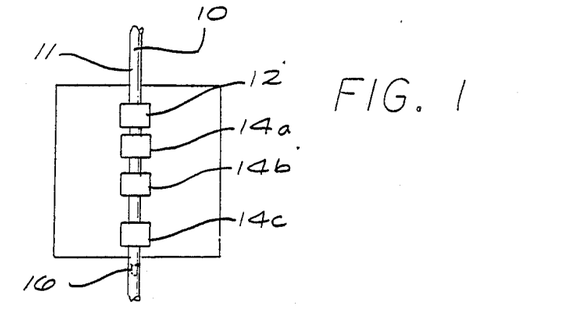
FIG. 1 is a schematic diagram of an embodiment of a thermal transit time flow measurement system utilizing one heater element and three sensor elements.

Referring to FIG. 1, as the resonant frequency of the microwave thermal sensors will be perturbed by changes in the temperature of the infusate in the tube, the passage of a heat pulse 16 is apparent by monitoring the resonant frequencies of one or more microwave thermal sensors 14a, b, and c, disposed external to the conduit, downstream from the heater element. At high flow rates the sensor element 14a nearest the heater 12 may detect the heated zone too soon after the onset of the microwave heating pulse to provide accurate flow rate information; therefore the furthest sensor element 14c would be utilized. At low flow rates, the nearest sensor element 14a will provide better detection of the thermal maker, which disperses as it propogates downstream.

Figure 2:
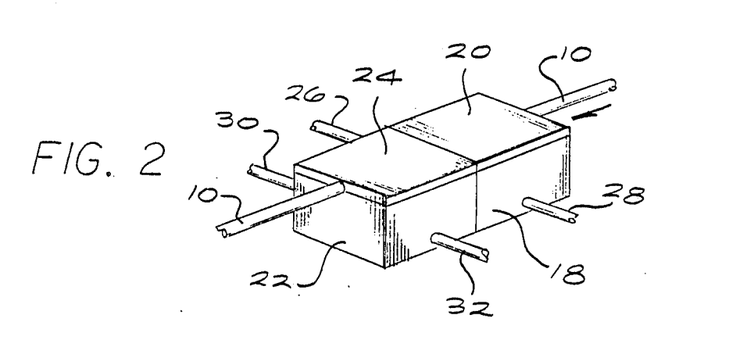
FIG. 2 is a perspective view of the mechanical parts of a preferred embodiment of a thermal transit time flow measurement system utlizing one heater element and one sensor element.
Figure 3:
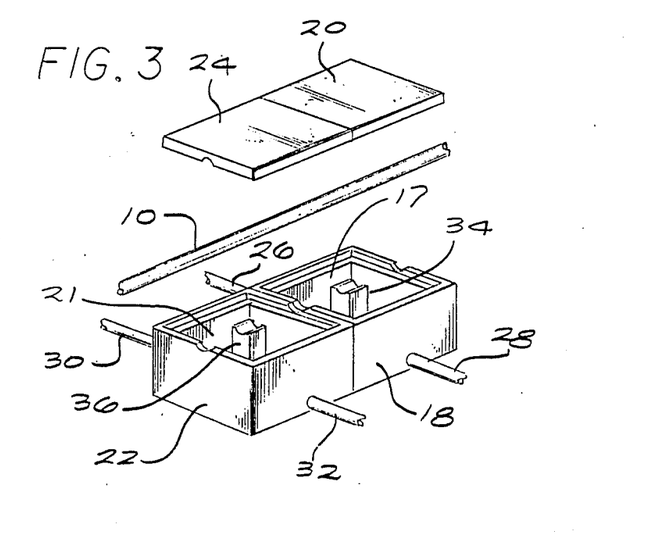
FIG. 3 an exploded view of the system of FIG. 2.

The preferred sensor for detecting a change in the temperature of the infusate comprises a low energy microwave device having a resonant microwave cavity encompassing a region of interest in the tube containing infusate. FIGS. 2 and 3 illustrate the mechanical components of a thermal transit time flow measurement system utilizing two microwave cavities, one for heating and one for sensing. For the sake of simplicity, these cavities are shown adjacent to one another, of equal size and having a rectangular shape, though other shapes, such as cylindrical, and other sizes, could be employed. It is not necessary that the heater cavity 17 and sensor cavity 21 be identical. In systems with multiple sensor cavities and/or multiple heater cavities, each cavity may have a unique geometry. The fluid conduit 10 enters the heater cavity housing 18 and exits from the sensor cavity housing 22. Both cavities are substantially closed spaces with electrically conductive inner surfaces. The heater cavity shape is defined by the heater cavity housing 18 and the heater cavity cover 20. Similarly, the sensor cavity shape is defined by the sensor cavity housing 22 and the sensor cavity cover 24. The cavity covers, which are necessary for enclosure of the cavity space, also shield the cavities. The microwave heater is operated as a single-mode or dominant mode resonant cavity in which the microwave energy is significantly confined. The full enclosure of the cavities prevents energy from impinging on objects external to the cavities, and in the case of the sensor subsystem, this shielding also prevents energy from outside of the cavity from interfering with sensor operation. Each cavity also includes two electrical ports, one for coupling microwave energy into the cavity from external circuitry, and the other for coupling microwave energy out of the cavity to external circuitry. The input cable 26 to the heater cavity conveys energy into the cavity, and the output cable 28 from the heater cavity conveys energy out of the cavity. Corresponding input and output cables 30 and 32 convey energy into and out of the sensor cavity.

In FIG. 3, the heater focusing post 34 and the sensor focusing post 36 are both visible. The posts, which have electrically conductive surfaces, focus the electric field present within the cavities and are critical to operation of the preferred embodiment of the invention.

Figure 4:
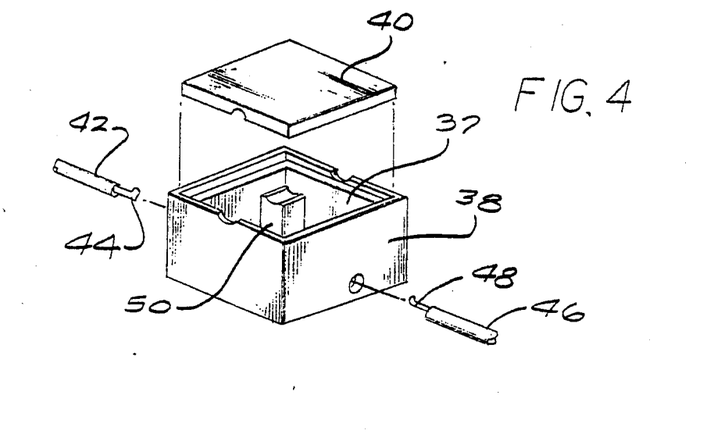
FIG. 4 is an exploded view of a resonant microwave cavity which can be utilized as either the heating element or the sensing element in the embodiment of FIG. 2.
Figure 5:
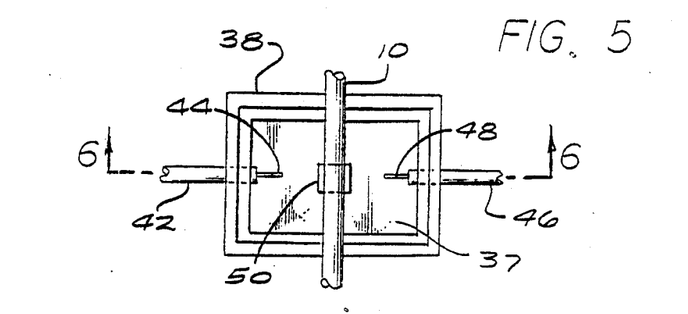
FIG. 5 is a top view of the resonant microwave cavity of FIG. 4.
Figure 6:
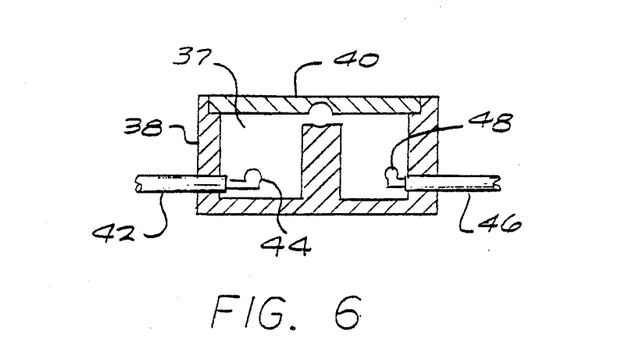
FIG. 6 is a cross-sectional view of the resonant microwave cavity element of FIG. 5 taken along line 6—6.

FIGS. 4, 5, and 6 illustrate a resonant microwave cavity which may be utilized for either the heater subsystem or the sensor subsystem. The rectangular form of the microwave cavity 37 is defined by the cavity housing 38 and the cavity cover 40. The microwave cavity has an input cable 42 which terminates in an input coupling loop 44, located within the internal cavity space, and an output cable 46 which is fed by an output coupling loop 48, also located within the internal cavity space. The cavity itself has a primary resonant mode, the frequency of which depends on the cavity's specific dimensions and geometry. When the cavity is resonating in its primary mode by means of energy introduced at the proper frequency by the input coupling loop, there will exist a region of high electric field density located in the gap between the focusing post 50 and the cavity cover 40. A portion of the fluid conduit is positioned within the gap. The focusing post need not be shaped as shown and need not be located in the center of the cavity; however, at no point does the surface of the focusing post contact the cavity cover. The resonant frequency of the cavity is affected by its shape and by the location, shape, and size of the focusing post, as well as by the distance between the top surface of the post and the lower surface of the cavity cover. Methods of field concentration similar to this are well-known to those skilled in the art, and any effective means of generating a focused electric field impinging on a specific region of the conduit within the cavity may be employed.

Figure 7:
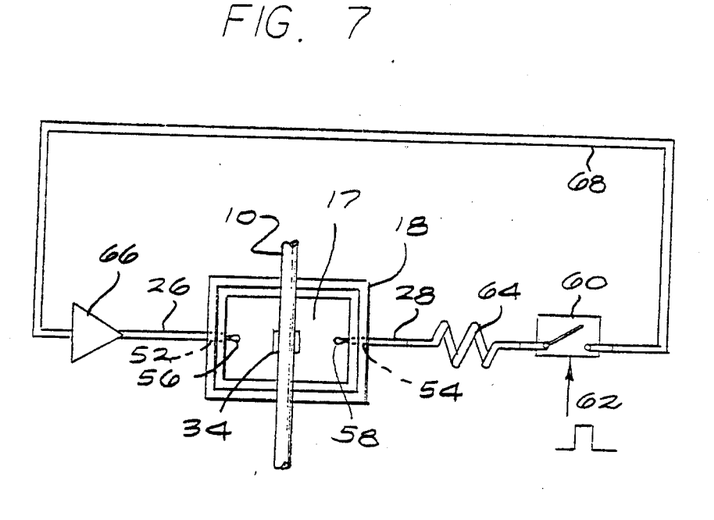
FIG. 7 is a schematic diagram of an electrical circuit for a microwave heater subsystem utilizing the resonant microwave cavity of FIG. 4.

The microwave heater cavity 17, illustrated in FIG. 7 with its cavity cover removed, has an input port 52, which allows the heater input cable 26 to enter the cavity, and an output port 54 which allows the heater output cable 28 to exit the cavity. The input cable 26 is terminated by the heater input coupling loop 56 through which microwave energy used for radiative heating is introduced into the cavity from external circuitry. The output cable 28 is fed by the heater output coupling loop 58 which couples a small amount of electromagentic energy out of the heater cavity to external circuitry. The heater circuit can be described as a power oscillator, with the cavity itself being the resonant component of the circuit. Energy introduced into the heater cavity via the input coupling loop establishes an electric field in the gap between the heater focusing post and the heater cavity cover. The heater can be switched on and off by means of the microwave switch 60, which is controlled by a heater pulse 62, heating occurring whenever the microwave switch is closed. The phase shift element 64 is necessary to provide the appropriate phase shift to support oscillation at the primary resonant mode of the cavity, and can be a delay element or a reactive component with the appropriate phase characteristic. The power amplifier 66 provides the necessary loop gain and power to support oscillation at a power level appropriate to heat the fluid. The oscillator circuit is completed by the connection from microwave switch to the power amplifier provided by cable or wiring 68. The fluid conduit passes through the cavity and heating occurs in the gap between the focusing post and the cavity cover. Alternative designs for circuitry associated with the microwave heater are also possible.

It is well known in that the dielectric constant of most liquids is dependent upon temperature. For example, water has a dielectric constant at 20° C. of 80.37 whereas the dielectric constant of water at 25° C. is 78.54 (Handbook of Chemistry and Physics, 68th Edition, CRC Press). A resonant microwave cavity which encompasses a portion of the conduit containing the fluid, and is thus loaded by the electromagnetic properties of the fluid within, may be employed as a sensor capable of detecting the passage of a thermal marker. Circuitry associated with the resonant microwave sensing cavity must be sensitive to changes in the cavity's resonant characteristics in order to indicate passage of the thermal marker. The electromagnetic properties of the fluid conduit itself also play a part in the behavior of a sensor of the preferred embodiment because the sensor, regardless of exactly how it functions, must encompass the conduit, and the conduit wall material therefore influences the electromagnetic field within the sensor cavity.

Figure 8:
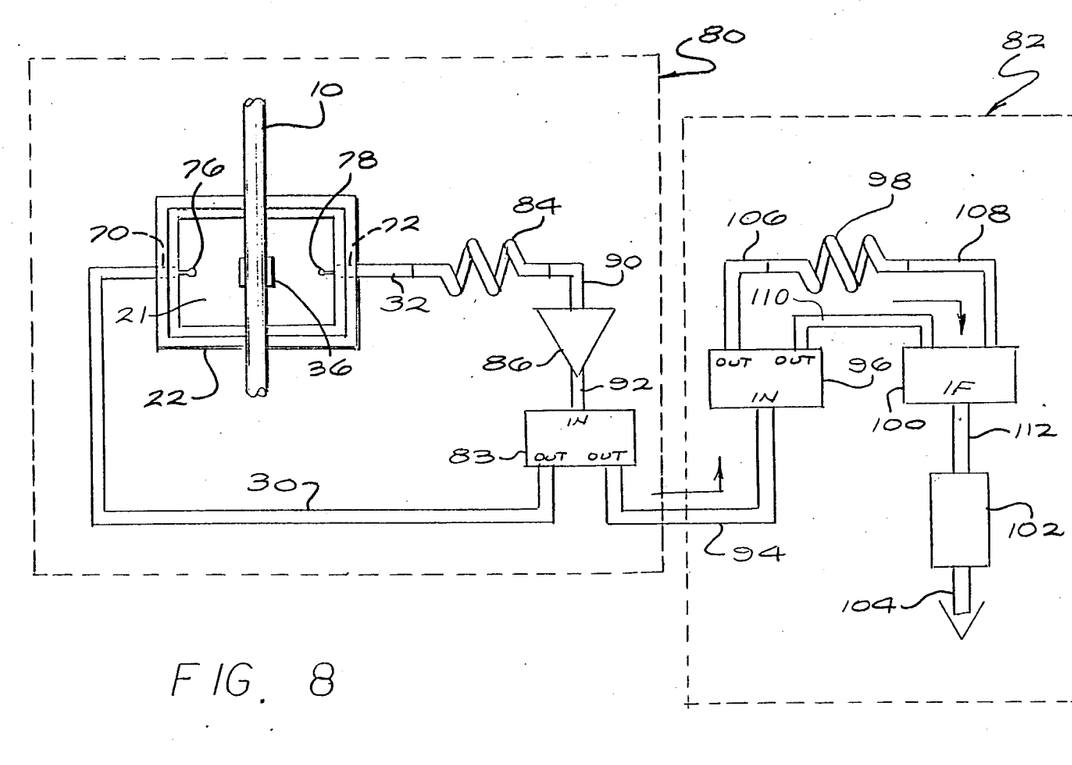
FIG. 8 is a schematic diagram of an electrical circuit for a preferred embodiment of a microwave sensor subsystem utilizing a resonant microwave cavity of FIG. 4 and a frequency discriminator.

A preferred embodiment of the electrical circuitry associated with the microwave sensor cavity element is illustrated in FIG. 8. The microwave sensor cavity has an input port 70, which allows the sensor input cable 30 to enter the cavity, and an output port 72 which allows the sensor output cable 32 to exit the cavity. The input cable is terminated by the sensor input coupling loop 76 through which a small amount of microwave energy, not intended to cause fluid heating, is introduced into the cavity from external circuitry. The output cable 32 is fed by the sensor output coupling loop 78 which couples a small amount of electromagnetic energy out of the sensor cavity to the external circuitry. The sensor subsystem consists of two major subcircuits, a low power microwave oscillator 80 and a frequency discriminator 82. The microwave oscillator causes the sensor cavity to resonate in its primary mode and thus establishes an electric field within the gap between the sensor focusing post 36 and the sensor cavity cover. A portion of this energy is coupled into the frequency discriminator subcircuit 82 by means of a 2-way power divider 83. Variations in the output signal of the frequency discriminator 82 indicate changes in the resonant frequency of the sensor cavity. Because the fluid's complex dielectric constant is influenced by temperature, and the cavity's resonance is in turn perturbed by changes in the dielectric constant of the fluid within, the passage of a thermal marker is thus apparent.

The oscillator portion 80 of the preferred embodiment of the sensor circuitry comprises the microwave resonant cavity 21, a phase shifting element 84, an amplifier 86, the interconnections 30, 32, 90, and 92, the power divider 83, and the input and output coupling loops, 76 and 78 respectively. The phase shifting element 84 is necessary to provide the appropriate phase shift to support oscillation at the primary resonant mode of the cavity and can be a delay element or an appropriate reactive component, and the amplifier 86 provides the necessary loop gain to support oscillation. The oscillator circuit is completed by the interconnections 32, 90, 92 and 30, and the power divider 83, which couples part of the oscillator signal through cable or wire 94 to the frequency discriminator 82. Interconnection 92 provides an electrical path from the output of the amplifier 86 to the input of the power divider 83, and interconnection 90 provides a path from the delay element 84 to the input of the amplifier 86. The fluid conduit passes through the cavity, and sensing occurs in the gap between the focusing post 36 and the cavity cover.

The frequency discriminator portion 82 of the preferred embodiment of the sensor circuitry contains the input cable or wire 94, another two-way power divider 96, a delay element 98, a mixer with a DC-coupled output 100, a low-pass filter 102, an output cable 104, and the interconnecting cables or wires 106, 108, 110, and 112. A portion of the energy from the oscillating resonant cavity is fed into the discriminator via cable or wire 94 and is split by power divider 96 into two signals, one of which is delayed by delay element 98. The delayed signal is fed into one input of the mixer 100, either the "RF" or "LO" port, via cable or wire 108, and the other signal, which is not delayed, is fed into the other input, either the "LO" or "RF" port, of the mixer 100 via cable or wire 110. The DC-component of the output of the mixer, available at its "IF" port, indicates changes in the cavity's resonant frequency. Low-pass filter 102, which is unnecessary if the bandwidth of the mixer is limited, ensures that the output signal at 102 contains only the DC-component of the mixer's output.

Figure 9:
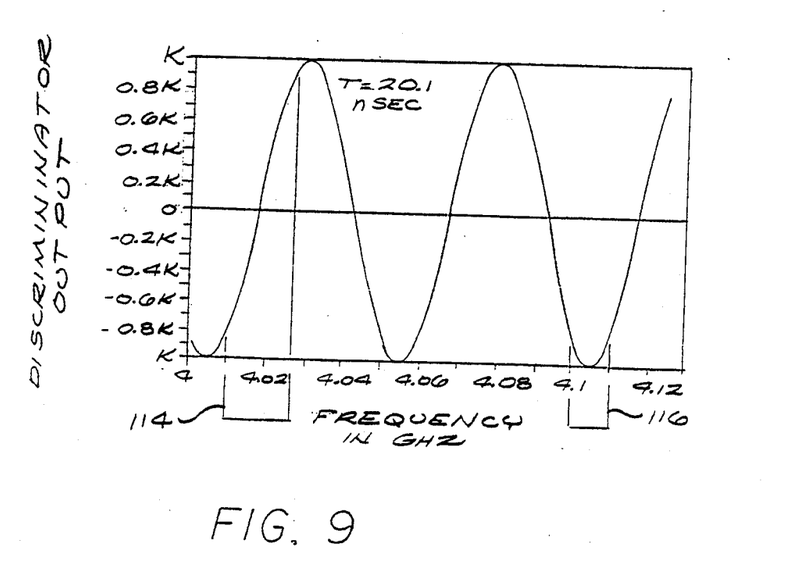
FIG. 9 is a graph representing the output signal of the sensor subsystem of FIG. 8 as a function of the oscillating frequency of the sensing microwave cavity.

Operation of the frequency discriminator can be described by simple mathematical relationships. Given that F is the oscillating frequency of the microwave sensor cavity in Hertz, and that the delay element provides a delay T in seconds, the output of the discriminator is ideally equal to $[K \cos(2\pi FT)]$, where K is a gain constant depending on the amplitude of the oscillation and other circuit details. For example, for F=4.02 Gigahertz and T=20.1 nanoseconds, the discriminator output would be 0.321K. If the resonant frequency is perturbed to 4.025 Gigahertz, the resulting output of the discriminator would be 0.818K. The delay element is chosen such that the discriminator sensitivity is high in the frequency region of operation. Near frequencies where $\cos(2\pi FT)=0$ best sensitivity exists; poor sensitivity exists near frequencies where $\cos(2\pi FT)=\pm 1$. In the specific case outlined above, good sensitivity exists in the range 4.0 Gigahertz to 4.025 Gigahertz. FIG. 9 illustrates the relationship between discriminator output and frequency for the particular case of T=20.1 nanoseconds in the frequency range of from 4.0 Gigahertz to 4.12 Gigahertz. A frequency range of high discriminator sensitivity 114 is indicated, and a region of low discriminator sensitivity 116 is also indicated. Characteristics and limitations of a simple frequency discriminator such as that utilized in the preferred embodiment of the sensor circuitry are well-known to those familiar with the art.

Alternative designs for the preferred embodiment of the circuitry associated with the microwave sensor cavity are possible, provided that an indication of the perturbation of the resonant characteristics of the sensor cavity are apparent. For example, by including a down converter in the path from the oscillator power divider 83 to the discriminator power divider 96, a frequency discriminator operating at a lower frequency can be utilized. This may provide greater sensitivity.

In operation, as the thermal marker passes through the sensor cavity, the resonant characteristics of the cavity change, due to the loading of the cavity by th encompassed fluid and the dependence of the fluid's dielectric constant on temperature, and consequently the frequency of the oscillator portion of the sensor circuitry changes. The oscillator portion of the circuit introduces a very small amount of energy into the sensor cavity which, in effect, "interrogates" the cavity in order to determine its resonant characteristics, yet the energy level is too small to cause significant heating of the fluid. The changes in oscillator frequency caused by the passage of the thermal marker are detected by the discriminator portion of the sensor circuitry, resulting in a change in the discriminator's output signal.

Figure 10:
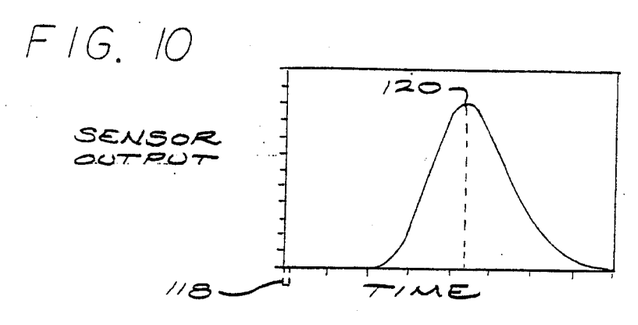
FIG. 10 is a graph representing a typical output signal of the sensor subsystem as a function of time, illustrating the detection of passage of a thermal marker.

With reference to the diagram of sensor output in FIG. 10, during the time period indicated by 118, the microwave heater is active. At the time indicated by 120, the sensor output is at a maximum, and the time from initial activation of the heater to this peak can be considered to be the thermal transit time of the resulting heat pulse.

Figure 12:
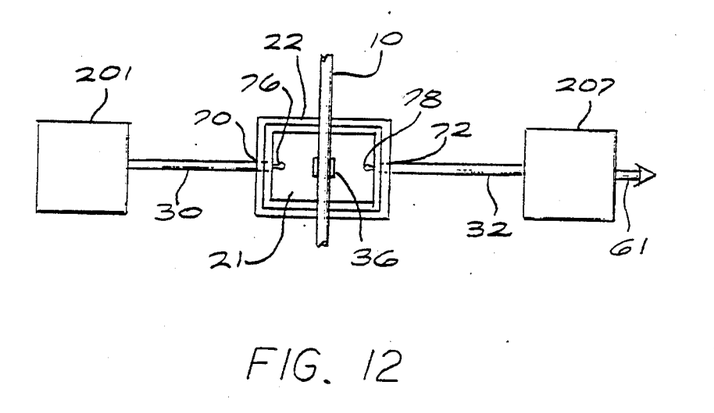
FIG. 12 is a schematic diagram of an electrical circuit for an alternative embodiment of a microwave sensor subsystem utilizing a resonant microwave cavity of FIG. 4 and an amplitude detector.

An alternative embodiment of the electrical circuitry associated with the microwave sensor cavity element is illustrated in FIG. 12. The microwave sensor cavity and its associated components, 22, 36, 70, 72, 76 and 78, function as described with reference to FIG. 8. In this embodiment, the resonant microwave sensor cavity functions as a filter, receiving its input energy from a low-level microwave signal source 201 via input cable 30. Signal source 201 operates near the resonant frequency of the sensor cavity, and this energy, in effect, "interrogates" the cavity to determine its resonant characteristics. The output cable from the sensor cavity 32 feeds a small portion of electromagnetic energy out of the sensor cavity and into an amplitude detector 207. When the resonant character of the sensor cavity is perturbed by the passage of the thermal marker, the response of the cavity to the low-level energy introduced by the signal source changes. This change is apparent at the output of the amplitude detector 207.

Figure 13:
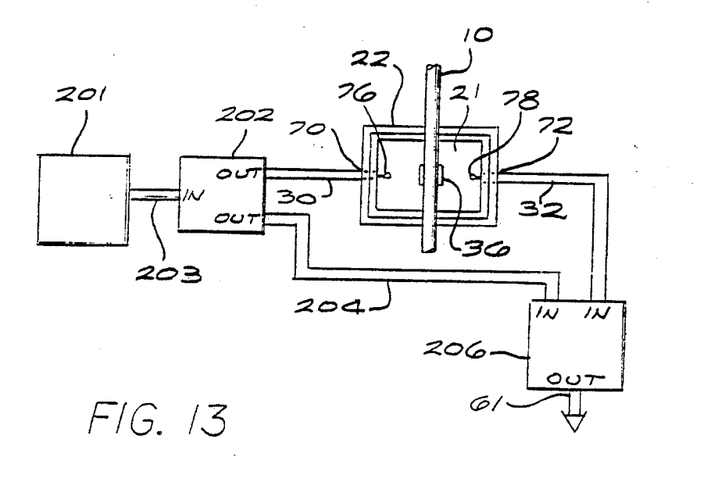
FIG. 13 is a schematic diagram of an electrical circuit for a further alternative embodiment of a microwave sensor subsystem utilizing a resonant microwave cavity of FIG. 4 and a phase detector.

A further alternate embodiment of the electrical circuitry associated with the microwave sensor cavity element is illustrated in FIG. 13. As in the embodiment illusrated by FIG. 12, the sensor cavity is functioning as a filter, however in this case the phase, rather than the amplitude, is the parameter of interest. Signal source 201 generates low-level microwave energy which if fed via interconnection 203 to the input of two-way power divider 202. A portion of this low-level energy is fed into the sensor cavity via input cable 30 and another portion is fed to one input of a phase detector 206 via interconnection 204. The output cable of the sensor cavity 32 feeds a small portion of electromagnetic energy out of the sensor cavity into the other input of the phase detector 206. The phase detector's output indicates differences in phase between the filtered and unfiltered microwave signals. When the resonant character of the sensor cavity is perturbed by the passage of the thermal marker, the phase response of the cavity to the low-level energy introduced by the signal source changes. This change is apparent at the output of the phase detector 206.

Figures 11, 14, 15:
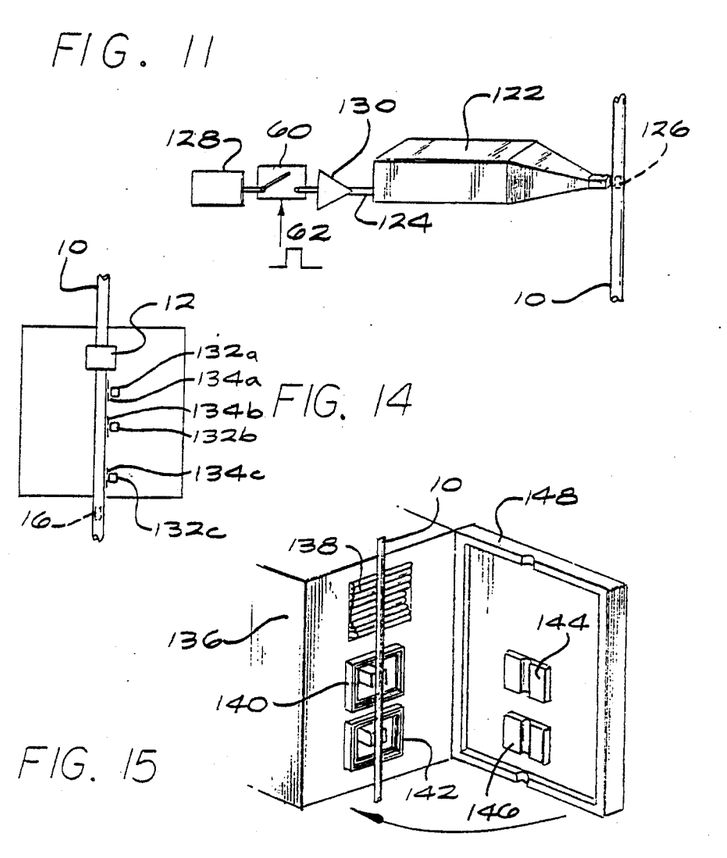
FIG. 11 is a schematic illustration of an alternative embodiment of a microwave heater subsystem comprising a tapered waveguide and associated electrical circuitry.
FIG. 14 is a schematic diagram of an alternative embodiment of a thermal transit time flow measurement system utilizing infrared sensors.
FIG. 15 is a perspective view of a further alternate embodiment of the thermal transit time flow measurement system, in conjunction with a peristaltic fluid pumping system.

An alternative type of microwave heater subsystem of the tapered waveguide type is illustrated in FIG. 11. Microwave energy is fed into the waveguide 122 from feed 124 on one side of the waveguide, and energy is directed to the opposite side of the waveguide in such a manner that the electric field is concentrated at the region of heating 126 of the fluid within the conduit. A preferred embodiment of the electrical circuit associated with the tapered waveguide heater consists of an oscillator 128, the output of which is fed through a microwave switch 60 and then fed into a microwave power amplifier 130. The output of the amplifier is fed into the waveguide via the input feed line 124. This heater can be switched on and off by means of the microwave switch 60, which is controlled by an electrical signal 62. The presence of the fluid, and to a lesser degree the conduit itself, loads the tapered waveguide and the fluid absorbs much of the energy which propagates down the waveguide and impinges upon it. The waveguide dimensions and the oscillator frequency are chosen such that a high electric field density exists in the region of heating.

Another alternative embodiment of a heat sensor which may be utilized within the flow measuring apparatus of the present invention is illustrated in FIG. 14, showing three infrared sensors 132a, b, and c. Also shown in the figure are focusing elements 134a, b, and c, associated with each infrared sensor, illustrated for the sake of simplicity as being pinhole structures.

The electrical signals supplied by the sensor or sensors in the thermal transit time flow measurement system of the present invention must be processed or analyzed in order to determine fluid flow rate. In a preferred embodiment of the invention, this signal processing is implemented by microprocessor means. Similarly, the control of the heater subsystem is implemented by microprocessor means, which enable and disable the heater at specific times. As a great many instruments currently produced incorporate a microprocessor, the signal processing and heater control requirements of the present invention do not represent a large extra cost burden. In many hospital fluid delivery systems, for example, the integral microprocessor performs many computational and control tasks, including communications with the operator of the instrument, allowing the operator to choose the desired flow rate, and control of the pumping mechanism. With a flow measurement system of the present invention incorporated within an infusion instrument, this same microprocessor can also perform the heater control and sensor signal processing tasks. Additionally, the microprocessor can be involved with the closed loop control of the infusion instrument, thereby maintaining a desired flow rate.

A microprocessor means can analyze the signals from the sensor array elements, and trigger the heat pulses used by the flow measurement system. The alogrithm used by the microprocessor means can be adapted to be responsive to the heat sensor elements, and the repetition rate of heating pulses may also be adapted, as may the power and/or duration of the individual heat pulses, depending upon flow rate.

The signal processing algorithms may take a wide variety of possible forms as are known in the art. For example, an algorithm can compare the transit times of the heat pulses, along the distance from the point of their generation to the sensor, with reference times for a corresponding distance at standardized flow rates, and calculate the actual flow rate. The instrument might have standard times and flow rates pre-programmed to correspond to the particular type of conduit to be utilized in the instrument, or the instrument might be pre-programmed with reference standards for several different types of conduit. The signal processing could also be simply used to monitor changes in the flow rate, once the proper flow rate has been set, without the need to calculate absolute flow rates. An algorithm could monitor extremes of flow rates, thereby triggering an alarm in the event of dangerous situations such as blockage of flow, or a disconnected line, or other similar situations. The signal processing may also, for example, be used in connection with flow rate feedback and control systems, for active control of IV administration or an industrial process.

A preferred method of signal processing is to incorporate within the microprocessor memory a look-up table that relates the features of the sensor signals to the flow rate range and to utilize the microprocessor to interpolate between table entries to derive flow rates intermediate to values within the look-up table.

The range of flow rates measurable by means of the present invention may be extended by providing more than one sensor element or more than one heater element. As described above, there will be a very low rate regime in which the best results are obtained by using the most closely spaced heater-sensor pair. Conversely, the most widely spaced heater-sensor pair will provide the best results at high flow rates. To extend the flow rate range of the present invention to lower flow rates, it is therefore necessary to place the active sensor as close to the active heater as practical, and also to employ an energetic heat pulse, both of these actions causing a greater temperature rise in the thermal marker as it passes through the sensor. Increasing the power of the heater subsystem has the effect of producing a more energetic heat pulse, as does lengthening the duration of the control signal that controls the heater pulse. Lengthening the duration of the heat pulse has an adverse effect on the number of discrete flow rate measurements that can be made over a given period of time; however, in many applications, including infusion in a medical setting, the flow rate is generally slowly varying.

At higher flow rates, in systems with multiple sensor elements, two or more sensor elements may detect the warmed zone. In this regime, the signals from several sensor elements can be correlated to provide a higher degree of measured flow rate accuracy than would be possible with only one element. Additionally, techniques such as digital filtering and ensemble averaging may also be used.

An understanding of the precise physics of warmed zone creation, propagation, diffusion, and sensing is necessary to fully optimize heater control and sensor signal processing. However, flow rate measurement accuracy can be attained, provided that over the useful flow rate range of the instrument the system behaves in a determinable and repeatable manner, providing sensor signals that are relatively noise-free. Electrical noise and any other non-deterministic characteristics of the sensor signals limit the accuracy and precision of the system.

FIG. 15 shows a further embodiment of the thermal transit time flow measurement system which is well-suited for measurement of flow rate in a medical fluid delivery system. An enclosure 136 houses the pump mechanism 138, illustrated as a peristaltic type device for simplicity, a microwave heater cavity body 140, positioned and adapted to receive the fluid conduit, and a microwave sensor cavity body 142, also positioned and adapted to receive the fluid conduit. Corresponding covers 144 for the heater element and 146 for the sensor element are mounted in mating relationship with the heater element and sensor element on a hinged door 148.

From the foregoing it will be appreciated that the flow rate measurement apparatus of the invention provides a simple, cost effective, accurate way of measuring fluid flow in a conduit, without fluid contact, and which can also provide accurate flow measurements over a wide range of flow rates for a wide variety of fluids and environmental conditions. It should be apparent that other forms of radiative heating and sensing with similar characteristics of rapid heating and rapid heat sensing may be suitable alternatives. Specifically, infrared energy could also be used to heat the fluid. This energy could be derived from a laser and applied by means of fiber optics and/or infrared lenses for focusing. Alternative sensing elements include infrared radiation sensing elements or detectors of microwave energy radiated by the thermal marker as it progresses downstream. Furthermore, it should be apparent that the flow rate measurement apparatus of the invention is useful for measuring fluid flow through conduits in a variety of medical, scientific and industrial applications.

Although specific embodiments of the invention have been described and illustrated, it is clear that it is susceptible to numerous modifications and embodiments within the ability of those skilled in the art and without the exercise of the inventive faculty. Thus, it should be understood that various changes in form, detail and application of the present invention may be made without departing from the spirit and scope of the invention.

I claim:

1. Apparatus for measuring the rate of flow of a fluid through a conduit, comprising
   (a) at least one heater means for generating radiative heat energy in a manner sufficient to produce a thermal marker in said fluid flow, said heater means not physically in contact with said fluid;
   (b) at least one sensor means for detecting said thermal marker in said fluid, not physically in contact with said fluid, and adapted to generate an electrical signal responsive to the proximity of said thermal marker to said sensor means; and
   (c) signal processing means operatively connected to said heater means and said sensor means for determining a parameter of fluid flow rate within the conduit based upon the magnitude of the signal from said sensor means as a function of time.

2. The apparatus of claim 1, wherein said heater means comprises a means for generating microwave radiation.

3. The apparatus of claim 1, wherein there are a plurality of said sensor means, each disposed at a different locus downstream from said at least one heater means.

4. The apparatus of claim 1, wherein said sensor means is responsive to changes in the complex dielectric constant of said fluid.

5. The apparatus of claim 4 wherein said sensor means includes means for generating an electric field of low-energy microwave radiation within a resonant microwave cavity within which a portion of said fluid conduit is placed.

6. The apparatus of claim 5, wherein said sensor means includes means for focusing the electric field of said low-energy microwave radiation on a portion of said fluid flowing within said conduit.

7. The apparatus of claim 6, wherein said sensor means includes means for determining the resonant characteristics of said microwave sensor cavity.

8. The apparatus of claim 7, wherein said means for determining the resonant characteristics of said microwave sensor cavity comprises a low-power microwave amplifier, said amplifier operatively connected to said microwave sensor cavity thereby creating a low-power microwave oscillator operating at or near the resonant frequency of said microwave sensor cavity, and a frequency discriminator operatively connected to said low power microwave oscillator.

9. The apparatus of claim 7, wherein said means for determining the resonant characteristics of said microwave sensor cavity comprises a low-level microwave signal source, said signal source operating near the resonant frequency of said microwave sensor cavity and operatively connected to said microwave sensor cavity, and an amplitude detector operatively connected to said microwave sensor cavity.

10. The apparatus of claim 7, wherein said means for determining the resonant characteristics of said microwave sensor cavity comprises a low-level microwave signal source, said signal source operating near the resonant frequency of said microwave sensor cavity and operatively connected to said microwave sensor cavity, and a phase detector operatively connected to said signal source and to said microwave sensor cavity.

11. The apparatus of claim 1, wherein said at least one sensor means comprises a microwave radiometer disposed adjacent to the external surface of said fluid conduit.

12. The apparatus of claim 1, wherein said parameter of fluid flow rate is the mean velocity of said fluid flow.

13. The apparatus of claim 1, wherein said parameter of fluid flow rate is the volumetric rate of said fluid flow.

14. The apparatus of claim 1, wherein said signal processing means includes means for determining said rate of fluid flow based upon the measured period of time for said thermal marker to propagate from said heater means to said sensor means.

15. The apparatus of claim 1, wherein there are a plurality of said sensor means, and said signal processing means includes means for determining said rate of fluid flow based upon the measured period of time for said heat pulse to propagate from one of said sensor means to another of said sensor means.

16. The apparatus of claim 1, wherein said signal processing means is connected to a device for pumping or controlling said fluid flow and operative to maintain a selected flow rate.

17. The apparatus of claim 1, further including means for enabling and disabling said means for generating radiative heat energy.

18. The apparatus of claim 1, further including means for controlling the power level of said radiative heat energy.

19. Apparatus for measuring the rate of flow of a fluid through a conduit, comprising
   (a) at least one heater means for generating microwave radiation, including means for focusing said microwave radiation on a portion of said conduit in a manner sufficient to produce a thermal marker in said fluid flow, said heater means not physically in contact with said fluid;
   (b) at least one sensor means for detecting said thermal marker in said fluid, not physically in contact with said fluid, and adapted to generate an electrical signal responsive to the proximity of said thermal marker to said sensor means; and
   (c) signal processing means operatively connected to said heater means and said sensor means for determining a parameter of fluid flow rate within the conduit responsive to the signal from said sensor means.

20. The apparatus of claim 19, wherein said heater means comprises a microwave signal source operatively connected to a tapered waveguide type of heating element operating at a power sufficient to cause heating of a specific region in said fluid.

21. The apparatus of claim 19, wherein said heater means includes means for generating an electric field of microwave radiation within a resonant microwave cavity within which a portion of said fluid conduit is placed.

22. The apparatus of claim 21, wherein said heater means includes a signal source operatively connected to said microwave cavity of power sufficient to cause heating of a specific region of said fluid, said signal source operating at or near the resonant frequency of said resonant microwave cavity to thereby deliver radiative microwave energy into said fluid.

23. The apparatus of claim 21 wherein said heater means includes said microwave cavity operatively connected to a microwave power amplifier thereby creating an oscillator operating at a power sufficient to cause heating of a specific region of said fluid, said oscillator operating at or near the resonant frequency of said resonant microwave cavity to thereby deliver radiative microwave energy into said fluid.

24. The apparatus of claim 19, wherein there are a plurality of said heater means, each being disposed at a different locus upstream of at least one said sensor means.

25. Apparatus for measuring the rate of flow of a fluid through a conduit, comprising
   (a) at least one heater means for generating radiative heat energy in a manner sufficient to produce a thermal marker in said fluid flow, said heater means not physically in contact with said fluid;
   (b) at least one sensor means for generating an electric field of low-energy microwave radiation within a resonant cavity within which a portion of said fluid is placed, including means for focusing the electric field of said low-energy microwave radiation on a portion of said fluid flowing within the conduit, said sensor means being responsive to changes in the complex dielectric constant of said fluid for detecting said thermal marker in said fluid, said sensor means not physically contacting said fluid, and said sensor means being adapted to generate an electrical signal responsive to the proximity of said thermal marker to said sensor means; and
   (c) signal processing means operatively connected to said heater means and said sensor means for determining a parameter of fluid flow rate within the conduit responsive to the signal from said sensor means.

26. The apparatus of claim 25, wherein said sensor means includes means for determining the resonant characteristics of said microwave sensor cavity.

27. The apparatus of claim 26, wherein said means for determining the resonant characteristics of said microwave sensor cavity comprises a low-power microwave amplifier, said amplifier operatively connected to said microwave sensor cavity thereby creating a low-power microwave oscillator operating at or near the resonant frequency of said microwave sensor cavity, and a frequency discriminator operatively connected to said low power microwave oscillator.

28. The apparatus of claim 26, wherein said means for determining the resonant characteristics of said microwave sensor cavity comprises a low-level microwave signal source, said signal source operating the near the resonant frequency of said microwave sensory cavity and operatively connected to said microwave sensor cavity, and an amplitude detector operatively connected to said microwave sensor cavity.

29. The apparatus of claim 26, wherein said means for determining the resonant characteristics of said microwave sensor cavity comprises a low-level microwave signal source, said signal source operating near the resonant frequency of said microwave sensory cavity and operatively connected to said microwave sensor cavity, and a phase detector operatively connected to said signal source and to said microwave sensor cavity.

* * * * *